US012154473B2

(12) United States Patent
Choi

(10) Patent No.: US 12,154,473 B2
(45) Date of Patent: Nov. 26, 2024

(54) DATA DRIVING DEVICE AND DISPLAY DEVICE INCLUDING THE SAME

(71) Applicant: LX SEMICON CO., LTD., Daejeon (KR)

(72) Inventor: Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/192,024

(22) Filed: Mar. 29, 2023

(65) Prior Publication Data

US 2023/0230519 A1 Jul. 20, 2023

Related U.S. Application Data

(63) Continuation of application No. 17/555,328, filed on Dec. 17, 2021, now Pat. No. 11,640,781.

(30) Foreign Application Priority Data

Dec. 22, 2020 (KR) ........................ 10-2020-0180767

(51) Int. Cl.
*G09G 3/20* (2006.01)

(52) U.S. Cl.
CPC ....... *G09G 3/20* (2013.01); *G09G 2310/0272* (2013.01); *G09G 2310/0291* (2013.01); *G09G 2310/0297* (2013.01); *G09G 2310/08* (2013.01); *G09G 2320/0252* (2013.01)

(58) Field of Classification Search
CPC ... G09G 2310/0272; G09G 2310/0291; G09G 2310/0297; G09G 2310/08; G09G 2320/0252
See application file for complete search history.

(56) References Cited

U.S. PATENT DOCUMENTS

| | | | | |
|---|---|---|---|---|
| 5,574,516 | A * | 11/1996 | Kanai | H04N 9/16 348/742 |
| 7,724,226 | B2 | 5/2010 | Takahashi | |
| 9,001,089 | B2 | 4/2015 | Choi et al. | |
| 9,905,167 | B2 * | 2/2018 | Jeon | G09G 5/008 |
| 10,127,863 | B2 * | 11/2018 | Jeon | G09G 3/3275 |
| 11,017,736 | B2 | 5/2021 | Kim et al. | |
| 11,054,849 | B2 | 7/2021 | Chien | |
| 11,094,264 | B2 | 8/2021 | In | |
| 11,355,053 | B2 | 6/2022 | Kim et al. | |
| 2004/0140985 | A1 | 7/2004 | Liaw | |
| 2007/0279574 | A1 | 12/2007 | Minamizaki | |
| 2009/0219265 | A1 * | 9/2009 | Lee | G09G 3/3291 313/504 |

(Continued)

FOREIGN PATENT DOCUMENTS

| | | | |
|---|---|---|---|
| JP | 6538341 | B2 | 7/2019 |
| KR | 10-2011-0047656 | A | 5/2011 |

(Continued)

*Primary Examiner* — Gene W Lee

(74) *Attorney, Agent, or Firm* — ROTHWELL, FIGG, ERNST & MANBECK, P.C.

(57) ABSTRACT

The present disclosure relates to a data driving device and a display device including the same, and more particularly, to a data driving device and a display device including the same, capable of improving the slew rate and the display speed of the display device by overdriving a pixel of a display panel with a power voltage of the data driving device.

19 Claims, 9 Drawing Sheets

(56) References Cited

U.S. PATENT DOCUMENTS

| | | | |
|---|---|---|---|
| 2018/0012553 A1 | 1/2018 | Kim et al. |
| 2020/0211466 A1 | 7/2020 | In |
| 2021/0011505 A1 | 1/2021 | Chien |
| 2021/0256923 A1 | 8/2021 | Kim et al. |

FOREIGN PATENT DOCUMENTS

| | | | |
|---|---|---|---|
| KR | 10-2018-0007038 A | 1/2018 |
| KR | 10-1820383 B1 | 1/2018 |
| KR | 10-2020-0080472 A | 7/2020 |
| KR | 10-2020-0123352 A | 10/2020 |

* cited by examiner

DATA DRIVING DEVICE AND DISPLAY DEVICE INCLUDING THE SAME

CROSS REFERENCE TO RELATED APPLICATION

This application is a continuation application of U.S. patent application Ser. No. 17/555,328 filed on Dec. 17, 2021, which claims priority from Korean Patent Application No. 10-2020-0180767, filed on Dec. 22, 2020, which is hereby incorporated by reference for all purposes as if fully set forth herein.

BACKGROUND

1. Technical Field

Various embodiments generally relate to a data driving device and a display device including the same.

2. Related Art

A display device includes a data processing device called a timing controller, a data driving device called a source driver, and a display panel. The data processing device may be designed to provide image data for display, control data and a clock to the data driving device in the form of a packet.

The data driving device receives the image data and provides a data voltage corresponding to the image data to the display panel, and the display panel displays a screen corresponding to the data voltage.

In such a display device, the adoption of a technique for improving a slew rate and a display speed in various components is required, and the adoption of a technique for improving a display speed at the levels of the data processing device and the data driving device is actively studied.

SUMMARY

Under such a background, in one aspect, the present disclosure is to provide a technique of improving the slew rate and the display speed of a display device by overdriving a pixel of a display panel with a power voltage of a data driving device.

In one aspect, the present disclosure provides a data driving device comprising: a buffer configured to, in order to drive one pixel among a plurality of pixels connected to one data line, output a data voltage of the one pixel by using a power voltage; and a multiplexer configured to receive the power supply voltage, to receive the data voltage from the buffer, to output the power voltage to the one data line to overdrive the one pixel, and then, to output the data voltage to the one data line.

The data driving device may further comprise a driving control circuit to determine whether to overdrive the one pixel by comparing pixel data of the one pixel with pixel data of another pixel located before the one pixel.

The driving control circuit may compare a first most significant bit (MSB) included in the pixel data of the other pixel with a second MSB included in the pixel data of the one pixel and, when the first MSB and the second MSB are different, identify in a preset lookup table an overdrive time depending on a separation distance between the one pixel and the buffer, generate an overdrive control signal corresponding to the overdrive time, and transmit it to the multiplexer.

In another aspect, the present disclosure provides a display device comprising: a data processing device configured to transmit image data including a plurality of pixel data; a power management device configured to output a power voltage; and a data driving device configured to receive the image data, to output, in order to drive one pixel among a plurality of pixels connected to one data line, a data voltage of the one pixel by using the power voltage and the image data, and, before outputting the data voltage of the one pixel, to output the power voltage to the one data line to overdrive the one pixel.

The data driving device may comprise a buffer which outputs a data voltage of the one pixel to the one data line. When the one pixel is located at a shortest distance from the buffer compared with the distances of the other pixels, the data driving device may overdrive the one pixel for a shortest time and when the one pixel is located at a longest distance from the buffer compared with the distances of the other pixels, the data driving device may overdrive the one pixel for a longest time.

As is apparent from the above description, according to the embodiments, because a pixel is overdriven with a power voltage higher than a maximum output voltage of a buffer, it is possible to improve the slew rate and the display speed of a display device as compared to an existing scheme of overdriving a pixel with a voltage outputted from the buffer.

DETAILED DESCRIPTION

Figure 1:
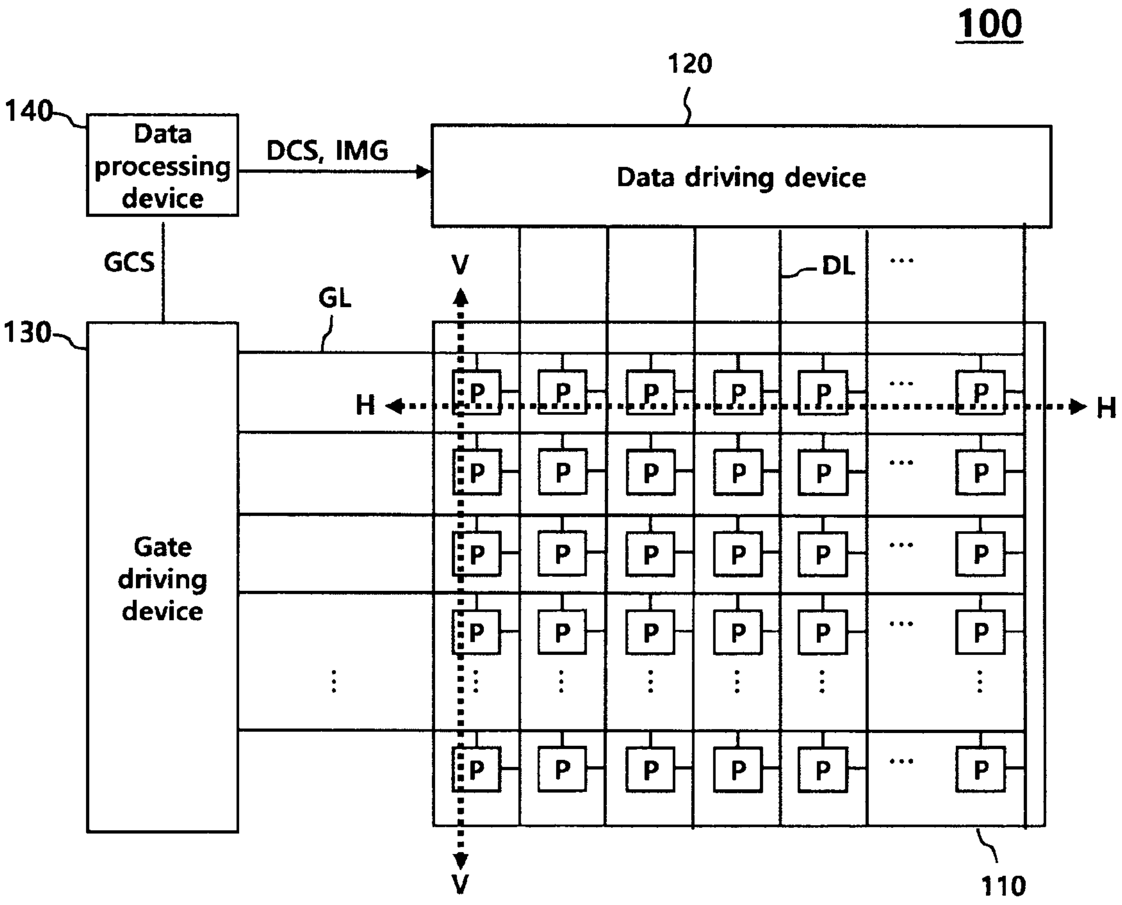
FIG. 1 is a configuration diagram of a display device in accordance with an embodiment.

FIG. 1 is a configuration diagram of a display device in accordance with an embodiment.

Referring to FIG. 1, a display device 100 may include a display panel 110, a data driving device 120, a gate driving device 130 and a data processing device 140.

A plurality of data lines DL and a plurality of gate lines GL may be disposed in the display panel 110. Further, a plurality of pixels P may be disposed in the display panel 110. The plurality of pixels P may be disposed adjacent to one another in a horizontal direction H and a vertical direction V of the display panel 110 to represent a quadrangular shape. The quadrangular shape is similar to a matrix. A set of a plurality of pixels P arranged in the horizontal direction H may be defined as a pixel row or a horizontal line, and a set of a plurality of pixels P arranged in the vertical direction V may be defined as a pixel column or a vertical line.

The gate driving device 130 may supply a scan signal of a turn-on voltage or a turn-off voltage to a gate line GL. When the scan signal of the turn-on voltage is supplied to a pixel P, the corresponding pixel P is connected to a data line DL, and when the scan signal of the turn-off voltage is supplied to a pixel P, the connection between the corresponding pixel P and a data line DL is released.

The data driving device 120 supplies a data voltage to a data line DL. The data voltage supplied to the data line DL is transferred to a pixel P which is connected to the data line DL according to the scan signal.

The data processing device 140 may supply various control signals to the gate driving device 130 and the data driving device 120. The data processing device 140 may generate a gate control signal GCS which causes a scan to be started according to a timing implemented in each frame, and may transmit the gate control signal GCS to the gate driving device 130. The data processing device 140 may convert image data, inputted from the outside, into image data IMG to match a data format used in the data driving device 120, and may output the image data IMG to the data driving device 120. The data processing device 140 may transmit a data control signal DCS which controls the data driving device 120 so that the data driving device 120 supplies a data voltage to each pixel P according to each timing.

At least one of the data driving device 120, the gate driving device 130 and the data processing device 140 described above may be included in one integrated circuit (IC).

Although not illustrated in FIG. 1, the display device 100 may further include a power management device for outputting a power voltage to the data driving device 120.

The power management device may generate a common electrode voltage (VCOM) and output the common electrode voltage (VCOM) to the display panel 110, and may generate a gate low voltage (VGL) and a gate high voltage (VGH) and output the gate low voltage (VGL) and the gate high voltage (VGH) to the gate driving device 130.

The display device 100 in accordance with the embodiment may be a device which is driven at a high speed.

The data driving device 120 may precharge a pixel P by outputting an overdrive voltage to the pixel P so as to reduce a display time.

In other words, the data driving device 120 may precharge a pixel P by outputting an overdrive voltage to the pixel P so as to improve a slew rate and a display speed.

Figure 2:
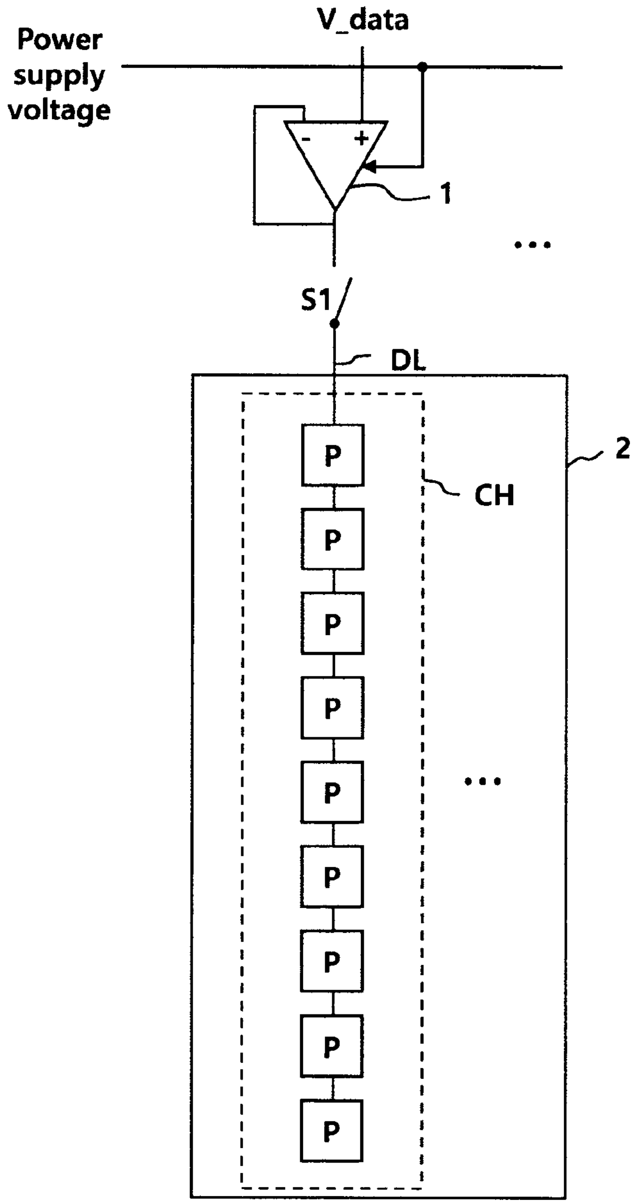
FIG. 2 is a diagram to assist in the explanation of an overdrive scheme of a general data driving device.

In an overdrive scheme of a general data driving device, as illustrated in FIG. 2, before a buffer 1 outputs a data voltage V_data to a pixel P which is connected to a data line DL, the buffer 1 precharges the pixel P by outputting, by itself, an overdrive voltage to the pixel P.

The buffer 1 outputs the data voltage V_data and the overdrive voltage by using a power voltage.

Since a maximum output voltage of the buffer 1 is lower than the power voltage, there is a limit in reducing a display time even though the buffer 1 outputs the overdrive voltage at the maximum.

In an embodiment, in order to overcome such a problem, the data driving device 120 overdrives a pixel P with a power voltage.

Detailed description for this is as follows.

Figure 3:
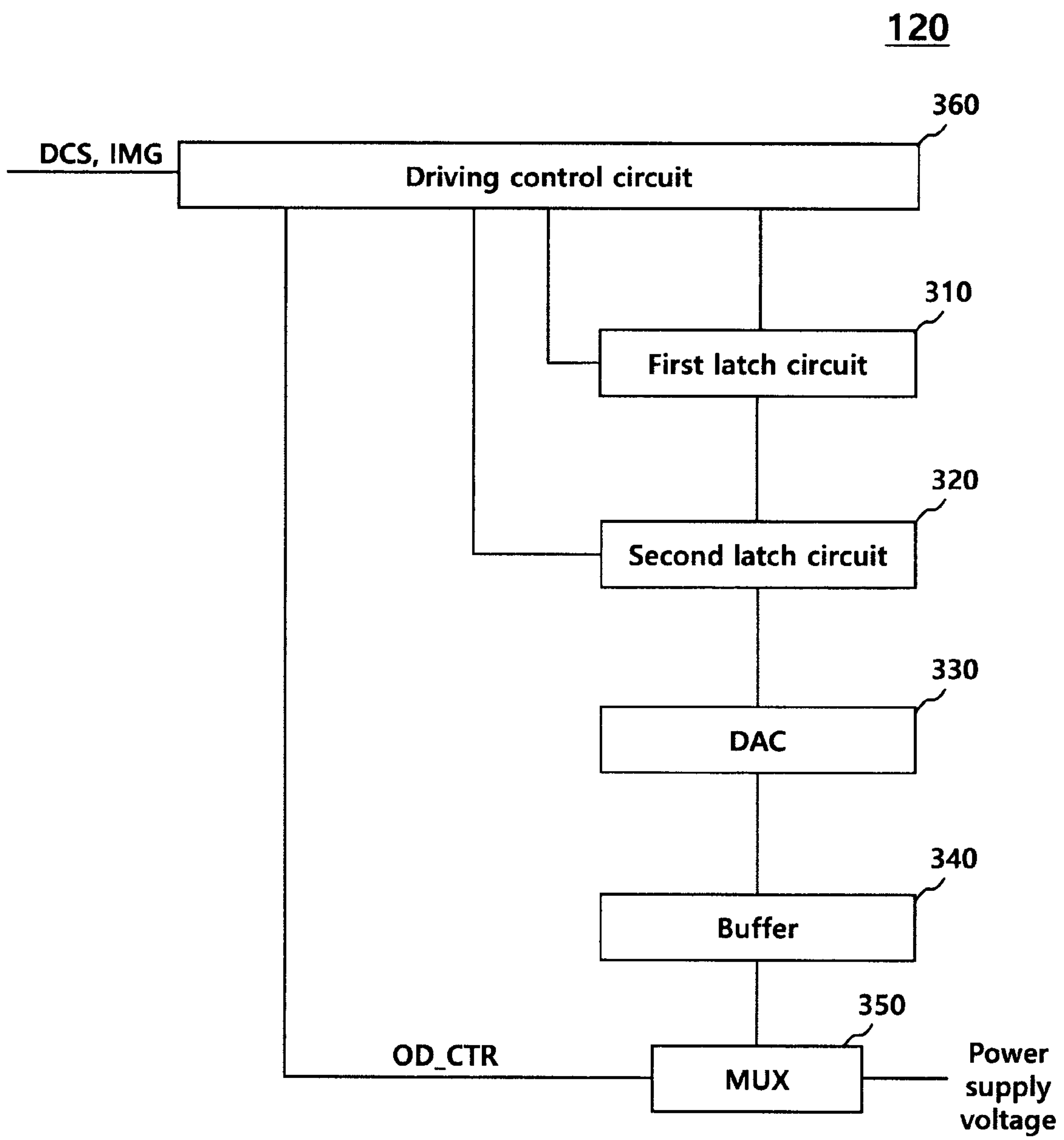
FIG. 3 is a configuration diagram of a data driving device in accordance with an embodiment.

FIG. 3 is a configuration diagram of the data driving device 120 in accordance with an embodiment.

Referring to FIG. 3, the data driving device 120 may include a first latch circuit 310, a second latch circuit 320, a digital-to-analog converter (DAC) 330, a buffer 340, a multiplexer (MUX) 350 and a driving control circuit 360.

The first latch circuit 310 may latch the image data IMG. The first latch circuit 310 may temporarily store image data and then output the image data to the second latch circuit 320. The first latch circuit 310 may temporarily store image data and then output the image data to the second latch circuit 320 according to a clock of a shift register (not illustrated).

The second latch circuit 320 may latch image data. The second latch circuit 320 may temporarily store image data and then output the image data to the digital-to-analog converter 330. The second latch circuit 320 may temporarily store image data and then output the image data to the digital-to-analog converter 330 according to a clock of a shift register (not illustrated).

The digital-to-analog converter 330 may receive image data from the second latch circuit 320. The digital-to-analog converter 330 may generate a data voltage, as an analog signal, from the image data. The digital-to-analog converter 330 may select a gray scale voltage, corresponding to the image data transmitted from the second latch circuit 320, among gray scale voltages of a preset step generated from a gamma reference voltage inputted from the outside, and may output the selected gray scale voltage to the buffer 340.

The buffer 340 may receive a data voltage V_data from the digital-to-analog converter 330. The buffer 340 may amplify the data voltage V_data and output an amplified data voltage to the data line DL.

Figure 4:
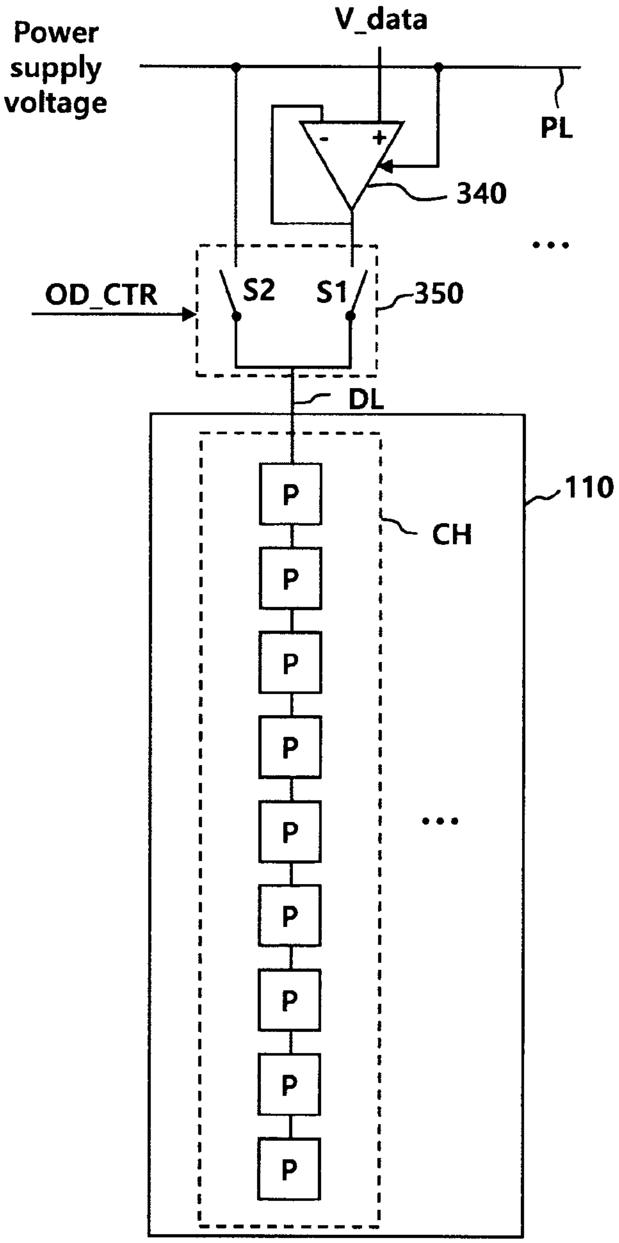
FIG. 4 is a diagram to assist in the explanation of an overdrive scheme of the data driving device in accordance with the embodiment.

In detail, as illustrated in FIG. 4, in order to drive a pixel P among a plurality of pixels P connected to a data line DL, the buffer 340 may amplify a data voltage of the pixel P by using a power voltage inputted from a power voltage line PL and output an amplified data voltage. The plurality of pixels P connected to the data line DL may be defined as one channel CH. In an embodiment, the data voltage may be any one of a positive data voltage and a negative data voltage, and the buffer 340 may be any one of a positive buffer and a negative buffer. The power voltage may be at least one of an analog power voltage (AVDD), a half power voltage (HVDD) and a ground voltage (GND).

The multiplexer 350 may receive the power voltage from the power voltage line PL and receive a data voltage from the buffer 340.

The multiplexer 350 may receive an overdrive control signal OD_CTR from the driving control circuit 360 to be described later.

Through the overdrive control signal OD_CTR, the multiplexer 350 may overdrive the pixel P by outputting the power voltage to the data line DL.

After overdriving the pixel P, the multiplexer 350 may output the data voltage, inputted from the buffer 340, to the data line DL. The data voltage outputted to the data line DL may be supplied to the pixel P.

The multiplexer 350 described above may include a first switch circuit S1 (see FIG. 4) and a second switch circuit S2 (see FIG. 4) for selecting one of two inputs.

The first switch circuit S1 receives the data voltage from the buffer 340. The second switch circuit S2 receives the power voltage from the power voltage line PL.

When the second switch circuit S2 is turned on by the overdrive control signal OD_CTR, the first switch circuit S1 may be turned off. Conversely, when the first switch circuit S1 is turned on, the second switch circuit S2 may be turned off.

In an embodiment, when the second switch circuit S2 is turned on, the pixel P may be overdriven by the power voltage.

Since the power voltage is higher than a maximum output voltage of the buffer 340, a slew rate may be improved compared to an existing scheme of overdriving a pixel P with a voltage outputted from the buffer 340. Due to this fact, a display speed may also be improved.

Meanwhile, in an embodiment, an overdrive time of the multiplexer 350 may be differentiated depending on a separation distance between each of the plurality of pixels P connected to the data line DL and the buffer 340. That is to say, a turn-on time of the second switch circuit S2 may be differentiated depending on the separation distance.

Figure 5:
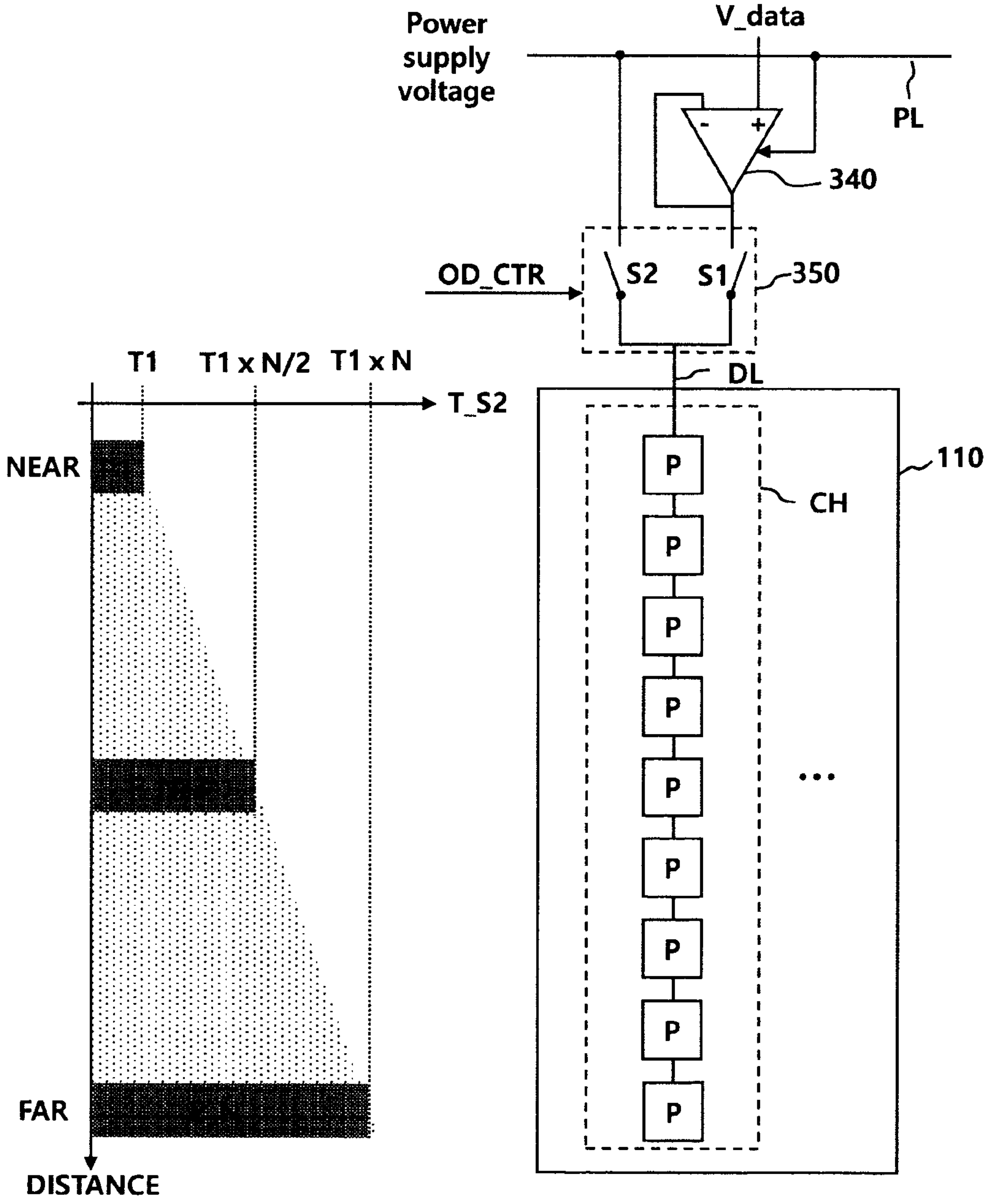
FIGS. 5 and 6 are diagrams to assist in the explanation of a configuration of setting an overdrive time of a pixel for each pixel in the data driving device in accordance with the embodiment.

In detail, as illustrated in FIG. 5, the multiplexer 350 may perform the overdrive of a first pixel P1, located at a shortest distance NEAR from the buffer 340 among the plurality of pixels P, for a shortest time T1.

The multiplexer 350 may perform the overdrive of an Nth pixel P_N, located at a longest distance FAR from the buffer 340 among the plurality of pixels P, for a longest time T1×N.

As described above, the multiplexer 350 may increase an overdrive time of a pixel P in proportion to a separation distance between the buffer 340 and the pixel P.

Figure 6:
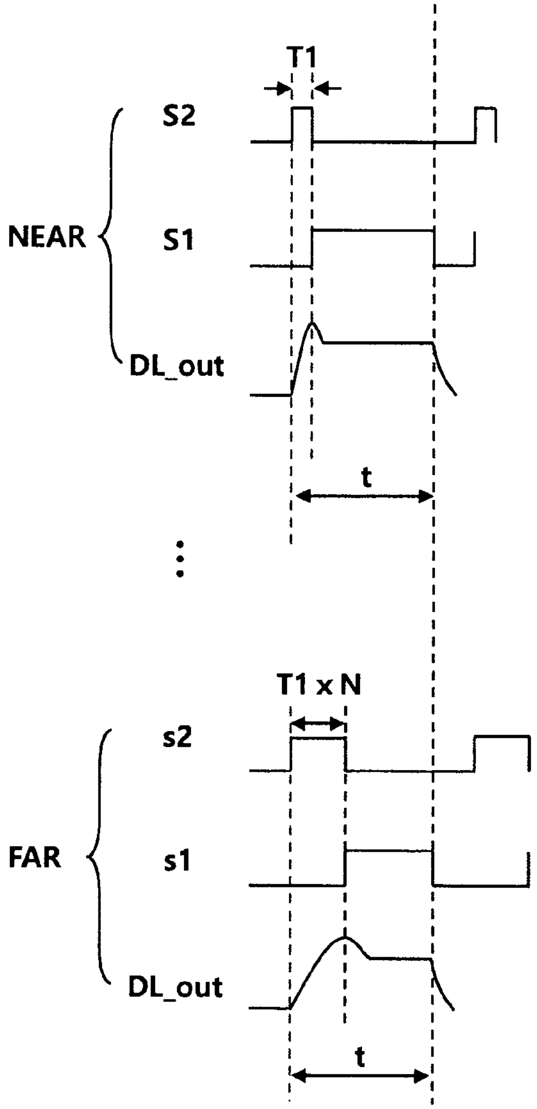

This is because a resistance component and a capacitance component may exist in the data line DL and the resistance component of the data line DL may increase in proportion to a length of the data line DL. Therefore, as illustrated in FIG. 6, the pixel P1 located at the shortest distance NEAR from the buffer 340 may be overdriven (see DL_out of FIG. 6) for the shortest overdrive time T1 due to a low resistance component of the data line DL.

On the other hand, the pixel P_N located at the longest distance FAR from the buffer 340 requires the relatively long overdrive time T1×N compared to the other pixels P due to a high resistance component of the data line DL.

Accordingly, in an embodiment, if a pixel P is located at a shortest distance from the buffer 340, the multiplexer 350 may perform the overdrive of the pixel P for a shortest time.

Conversely, if a pixel P is located at a longest distance from the buffer 340, the multiplexer 350 may perform the overdrive of the pixel P for a longest time.

Although FIG. 6 illustrates that the multiplexer 350 turns off the first switch S1 when a preset time t elapses, regardless of a separation distance between the buffer 340 and a pixel P, the embodiment is not limited thereto, and the multiplexer 350 may also differentiate a turn-off time point of the first switch S1 depending on a separation distance between the buffer 340 and a pixel P. Through this, a display time may be shortened compared to the conventional art.

In the above, a configuration of differentiating an overdrive time of a pixel P for each pixel P has been described.

Hereinafter, a configuration of setting an overdrive time of a pixel P for each pixel group will be described.

Figure 7:
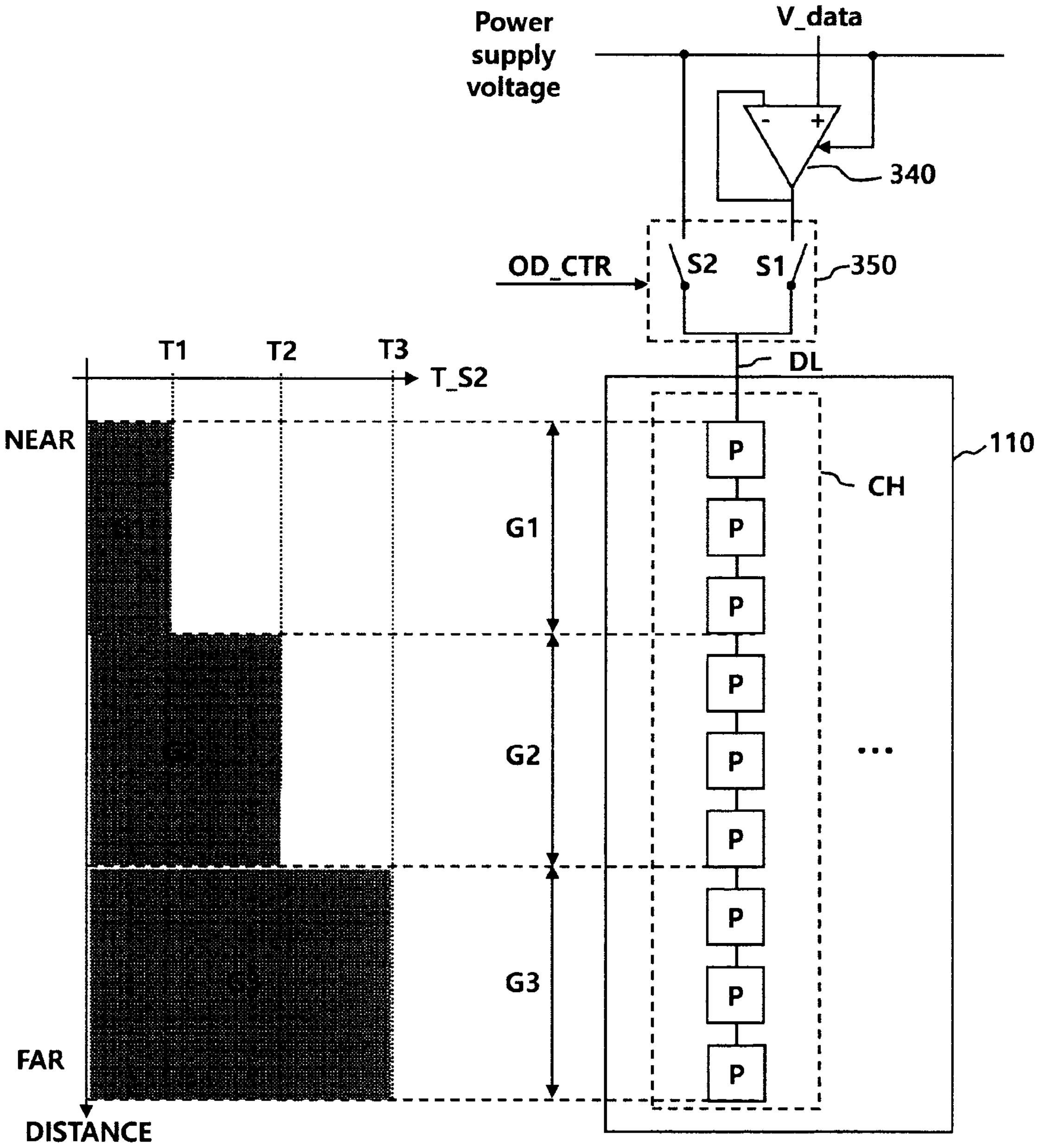
FIG. 7 is a diagram to assist in the explanation of a configuration of setting an overdrive time of a pixel for each pixel group in the data driving device in accordance with the embodiment.

Referring to FIG. 7, a plurality of pixels P connected to a data line DL may be divided into two or more pixel groups (e.g., G1, G2 and G3 of FIG. 7) depending on a separation distance from the buffer 340.

An overdrive time T1 of a first pixel group G1 separated by a shortest distance from the buffer 340 among the two or more pixel groups may be set to be shortest, and an overdrive time T3 of a last pixel group G3 separated by a longest distance from the buffer 340 among the two or more pixel groups may be set to be longest.

If a pixel to be overdriven by the multiplexer 350 is included in the first pixel group G1, the multiplexer 350 may overdrive the pixel by the overdrive time T1 set for the first pixel group G1.

If a pixel to be overdriven by the multiplexer 350 is included in the last pixel group G3, the multiplexer 350 may overdrive the pixel by the overdrive time T3 set for the last pixel group G3.

The driving control circuit 360 may receive the image data IMG from the data processing device 140. The image data IMG may include a plurality of pixel data.

The driving control circuit 360 may transfer pixel data of another pixel, located before one pixel among a plurality of pixels, to the first latch circuit 310. The pixel data of the another pixel may be stored in the second latch circuit 320 through the first latch circuit 310.

In a state in which the pixel data of the another pixel is stored in the second latch circuit 320, the driving control circuit 360 may transfer pixel data of the one pixel to the first latch circuit 310.

The driving control circuit 360 may determine whether to overdrive the one pixel, by comparing the pixel data of the one pixel stored in the first latch circuit 310 and the pixel data of the another pixel stored in the second latch circuit 320.

The driving control circuit 360 may compare a first MSB (most significant bit) which is an MSB included in the pixel data of the another pixel and a second MSB which is an MSB included in the pixel data of the one pixel.

If the first MSB and the second MSB are different from each other, the driving control circuit 360 may check, in a preset lookup table, an overdrive time depending on a separation distance between the one pixel and the buffer 340 or a separation distance between a pixel group including the one pixel and the buffer 340, and may generate the overdrive control signal OD_CTR corresponding to the checked overdrive time and transfer the overdrive control signal OD_CTR to the multiplexer 350.

If the first MSB and the second MSB are the same, the driving control circuit 360 may skip the overdrive of the one pixel by the multiplexer 350, and may generate the overdrive control signal OD_CTR for directly outputting a data voltage of the one pixel and transfer the overdrive control signal OD_CTR to the multiplexer 350.

The driving control circuit 360 may compare the entire pixel data of the another pixel and the entire pixel data of the one pixel.

Figure 8:
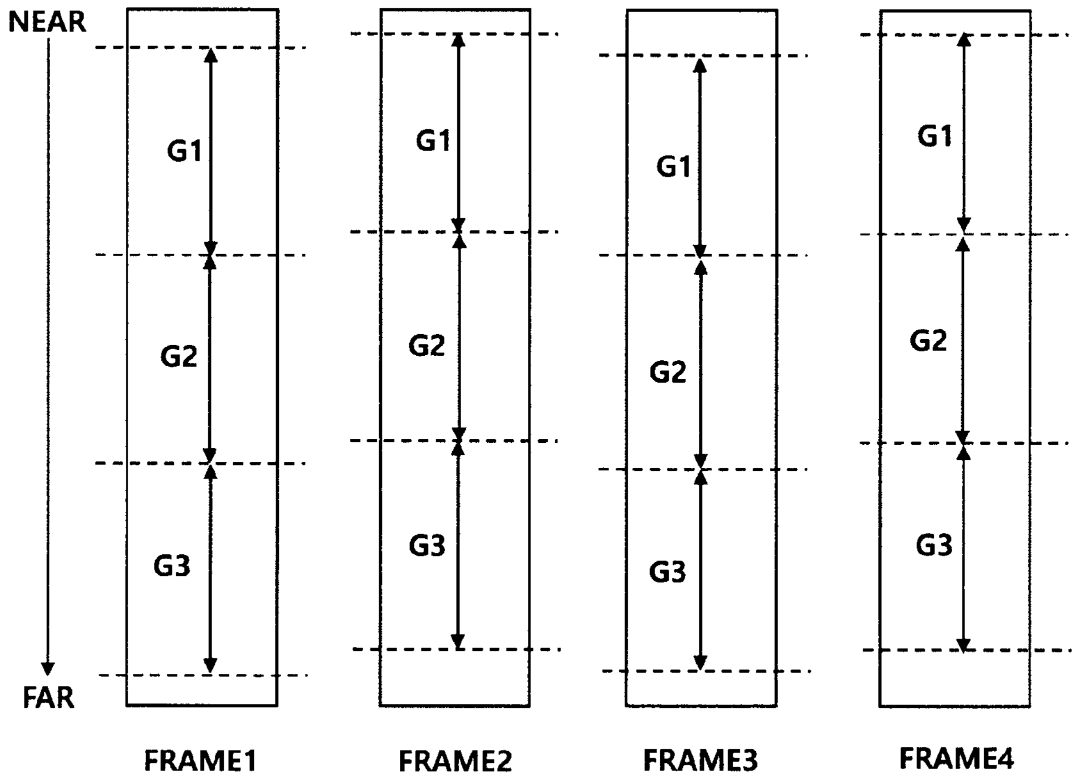
FIG. 8 is a diagram to assist in the explanation of a configuration of changing sizes of pixel groups in each frame in the data driving device in accordance with the embodiment.

In an embodiment, when an overdrive time is set for each pixel group, the driving control circuit 360 may change a size or a boundary of each of the two or more pixel groups G1, G2 and G3 in each frame of image data, as illustrated in FIG. 8.

Through this, it is possible to prevent a block dim phenomenon that may occur when the size of each of the two or more pixel groups G1, G2 and G3 is consistently fixed.

In the above, a configuration in which the driving control circuit 360, that is, the data driving device 120, determines by itself whether to overdrive one pixel, by comparing pixel data of the one pixel and pixel data of another pixel has been described.

However, it is to be noted that the embodiment is not limited thereto, and the data processing device 140 may determine whether to overdrive one pixel.

Figure 9:
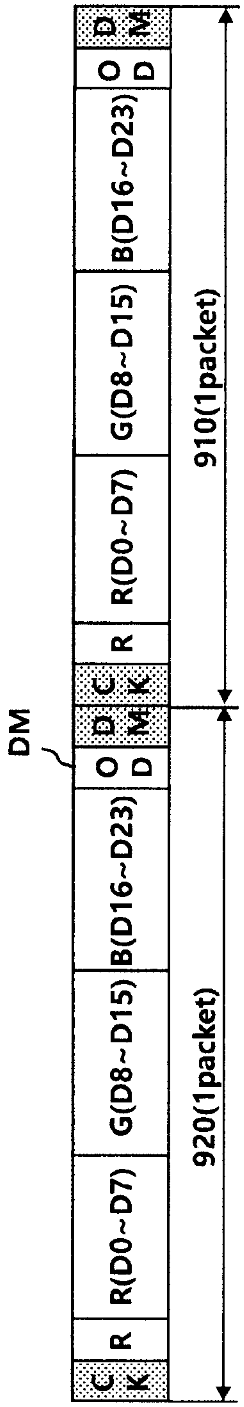
FIG. 9 is a diagram to assist in the explanation of a configuration of determining whether to overdrive a pixel in a data processing device in accordance with an embodiment.

FIG. 9 is a diagram to assist in the explanation of a configuration of determining whether to overdrive a pixel in a data processing device in accordance with an embodiment.

Referring to FIG. 9, the data processing device 140 may transmit a first data packet 910 including pixel data of another pixel to the data driving device 120 and then transmit a second data packet 920 including pixel data of one pixel to the data driving device 120.

Before transmitting the second data packet 920, the data processing device 140 may compare the pixel data of the another pixel and the pixel data of the one pixel.

According to a result of comparing the pixel data of the another pixel and the pixel data of the one pixel, the data processing device 140 may insert, into the second data packet 920, an indicator OD determining whether to overdrive the one pixel.

By comparing a first MSB included in the pixel data of the another pixel and a second MSB included in the pixel data of the one pixel, when the first MSB and the second MSB are different, the data processing device 140 may set the indicator OD to "1" and transmit the set indicator OD to the data driving device 120. The data driving device 120 which checks the indicator OD of "1" in the second data packet 920 may perform the overdrive of the one pixel.

When the first MSB and the second MSB are the same, the data processing device 140 may set the indicator OD to "0" and transmit the set indicator OD to the data driving device 120. The data driving device 120 which checks the indicator OD of "0" in the second data packet 920 may skip the overdrive of the one pixel and directly output a data voltage of the one pixel.

The data processing device 140 may insert the indicator OD into a dummy region DM included in the second data packet 920.

As is apparent from the above description, according to the embodiments, because a pixel is overdriven with a power voltage higher than a maximum output voltage of the buffer 340, it is possible to improve the slew rate and the display speed of the display device 100 as compared to an existing scheme of overdriving a pixel with a voltage outputted from the buffer 340.

What is claimed is:

1. A data driving device comprising:

a buffer configured to drive one of a plurality of pixels connected to one data line, and output a data voltage of said one of the plurality of pixels by using a power voltage from a power voltage line; and a switch configured to selectively connect the one data line to the buffer or the power voltage line, wherein the power voltage from the power voltage line is higher than a maximum output voltage of the buffer.

2. The data driving device of claim 1, wherein an input side of the switch is selectively connected to an output side of the buffer or the power voltage line, and an output side of the switch is connected to the one data line.

3. The data driving device of claim 1, wherein the switch comprises a first switch circuit and a second switch circuit for selecting one of two inputs.

4. The data driving device of claim 3, wherein the first switch circuit is configured to receive the data voltage from the buffer and the second switch circuit is configured to receive the power voltage from the power voltage line.

5. The data driving device of claim 4, wherein when the second switch circuit is turned on by an overdrive control signal, the first switch circuit is configured to be turned off.

6. The data driving device of claim 4, wherein when the first switch circuit is turned on, the second switch circuit is configured to be turned off.

7. The data driving device of claim 1, wherein the switch is configured to receive the power voltage from the power voltage line and to receive the data voltage from the buffer.

8. The data driving device of claim 7, wherein the switch is configured to output the power voltage to the one data line to overdrive said one of the plurality of pixels, and then, to output the data voltage to the one data line.

9. A display device comprising:

a data processing device configured to transmit image data including pixel data of a plurality of pixels;

a power supply configured to output a power voltage; and the data driving device according to claim 1.

10. A data driving device comprising:

a buffer configured to drive one of a plurality of pixels connected to one data line, and output a data voltage of said one of the plurality of pixels by using a power voltage from a power voltage line; and a switch configured to selectively connect the one data line to the buffer or the power voltage line, wherein said one of the plurality of pixels is located at a shortest distance from the buffer as compared to other pixels connected to the one data line, and a duration of overdriving said one of the plurality of pixels is shortest as compared to said other pixels connected to one data line.

11. A display device comprising:

a data processing device configured to transmit image data including pixel data of a plurality of pixels;

a power supply configured to output a power voltage; and the data driving device according to claim 10.

12. A data driving device comprising:

a buffer configured to drive one of a plurality of pixels connected to one data line, and output a data voltage of said one of the plurality of pixels by using a power voltage from a power voltage line; and a switch configured to selectively connect the one data line to the power voltage line, and output the power voltage to the one data line to overdrive said one of the plurality of pixels, wherein the plurality of pixels is divided into at least two pixel groups depending on how far each pixel is separated from the buffer, a duration of overdriving a pixel is set for each pixel group, and a boundary of each of the at least two pixel groups is configured to be adjustable.

13. The data driving device of claim 12, wherein the at least two pixel groups comprise a first pixel group and a second pixel group that is adjacent to the first pixel group, and a size of the first pixel group and a size of the second pixel group are different.

14. The data driving device of claim 12, wherein said one of the plurality of pixels is located at a shortest distance from the buffer as compared to other pixels connected to the one data line, and a duration of overdriving said one of the plurality of pixels is shortest as compared to said other pixels connected to the one data line, or said one of the plurality of pixels is located at a longest distance from the buffer as compared to said other pixels connected to the one data line and, a duration of overdriving said one of the plurality of pixels is longest as compared to said other pixels connected to the one data line.

15. The data driving device of claim 12, wherein the plurality of pixels is divided into the at least two pixel groups depending on how far each pixel is separated from the buffer, said one of the plurality of pixels is included in a first pixel group which is separated from the buffer by a shortest distance as compared to another pixel group included in the at least two pixel groups, and a duration of overdriving said one of the plurality of pixels is equal to a duration of overdriving another pixel included in the first pixel group.

16. The data driving device of claim 12, wherein the plurality of pixels is divided into the at least two pixel groups depending on how far each pixel is separated from the buffer, said one of the plurality of pixels is included in a last pixel group which is separated from the buffer by a longest distance as compared to another pixel group included in the at least two pixel groups, and a duration of overdriving said one of the plurality of pixels is equal to a duration of overdriving another pixel included in the last pixel group.

17. The data driving device of claim 12, further comprising a driving control circuit to determine whether to overdrive said one of the plurality of pixels by comparing pixel data of said one of the plurality of pixels with pixel data of another pixel located before said one of the plurality of pixels.

18. The data driving device of claim 17, wherein the driving control circuit is configured to:

compare a first most significant bit (MSB) included in the pixel data of said another pixel with a second MSB included in the pixel data of said one of the plurality of pixels, when the first MSB and the second MSB are different, identify in a preset lookup table an overdrive time for said one of the plurality of pixels depending on a separation distance between said one of the plurality of pixels and the buffer, generate an overdrive control signal corresponding to the overdrive time, and transmit the overdrive control signal to the switch.

19. A display device comprising:

a data processing device configured to transmit image data including pixel data of a plurality of pixels;

a power supply configured to output a power voltage; and the data driving device according to claim 12.

* * * * *